(12) United States Patent
Himeda

(10) Patent No.: US 11,299,605 B2
(45) Date of Patent: Apr. 12, 2022

(54) HEAVY DUTY PNEUMATIC TIRE

(71) Applicant: SUMITOMO RUBBER INDUSTRIES, LTD., Hyogo (JP)

(72) Inventor: Shingo Himeda, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 212 days.

(21) Appl. No.: 16/597,209

(22) Filed: Oct. 9, 2019

(65) Prior Publication Data

US 2020/0131346 A1 Apr. 30, 2020

(30) Foreign Application Priority Data

Oct. 24, 2018 (JP) .............................. JP2018-200013

(51) Int. Cl.
*C08L 9/06* (2006.01)
*B60C 1/00* (2006.01)
*B60C 11/00* (2006.01)
*C08L 7/00* (2006.01)

(52) U.S. Cl.
CPC .............. *C08L 9/06* (2013.01); *B60C 1/0016* (2013.01); *B60C 11/0008* (2013.01); *C08L 7/00* (2013.01); *B60C 2011/0016* (2013.01); *B60C 2200/06* (2013.01); *C08L 2205/025* (2013.01); *C08L 2205/03* (2013.01)

(58) Field of Classification Search
CPC .. C08L 9/06; C08L 2205/03; C08L 2205/025; C08L 7/00; B60C 1/0016; B60C 11/0008

USPC ......................................................... 523/156
See application file for complete search history.

(56) References Cited

U.S. PATENT DOCUMENTS

| 5,804,645 | A  | * | 9/1998  | Matsuo    | C08K 3/26    |
|           |    |   |         |           | 524/127      |
| 2005/0209394 | A1 | * | 9/2005  | Sandstrom | B60C 1/0016  |
|           |    |   |         |           | 524/496      |
| 2011/0253202 | A1 | * | 10/2011 | Imazaki   | H01G 9/2013  |
|           |    |   |         |           | 136/254      |
| 2013/0048179 | A1 | * | 2/2013  | Muller    | B60C 11/0041 |
|           |    |   |         |           | 152/450      |
| 2014/0130949 | A1 | * | 5/2014  | Maehara   | B60C 11/0302 |
|           |    |   |         |           | 152/209.8    |
| 2014/0221526 | A1 | * | 8/2014  | Joseph    | C08L 9/00    |
|           |    |   |         |           | 523/156      |
| 2016/0263942 | A1 | * | 9/2016  | Tsuchida  | B60C 11/0008 |

FOREIGN PATENT DOCUMENTS

JP 2016-088343 5/2016

\* cited by examiner

*Primary Examiner* — Doris L Lee
(74) *Attorney, Agent, or Firm* — Greenblum & Bernstein, P.L.C.

(57) ABSTRACT

Provided is a heavy duty pneumatic tire having excellent abrasion resistance. The heavy duty pneumatic tire includes a tread portion including a rubber composition containing: an isoprene rubber; a butadiene rubber; a styrene-butadiene rubber; and a carbon black having an average particle size of 20 nm or less and/or a cetyltrimethylammonium bromide adsorption specific surface area of 130 $m^2/g$ or more, the tread portion having a land ratio of 81% or higher.

5 Claims, 1 Drawing Sheet

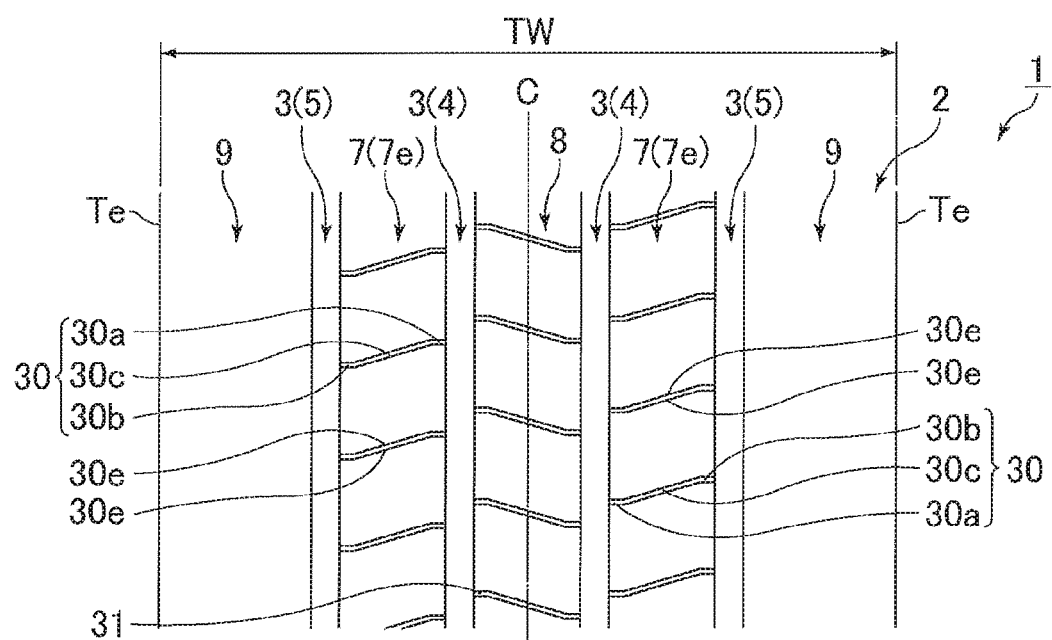

HEAVY DUTY PNEUMATIC TIRE

TECHNICAL FIELD

The present invention relates to a heavy duty pneumatic tire.

BACKGROUND ART

Heavy duty tires for large vehicles such as trucks and buses or other vehicles generally have a tread portion including: a plurality of main grooves extending continuously in the circumferential direction of the tires; and land portions defined by the main grooves. Such heavy duty tires require adequate total tire life and abrasion resistance (at high severity) from environmental and other standpoints. To this end, improvements have been made in tread pattern or compound recipe, for example.

For example, Patent Literature 1 discloses a heavy duty tire having a tread portion provided with circumferential grooves extending continuously in zig-zag fashion in the circumferential direction of the tire and inclined center grooves located to define a plurality of center blocks between the circumferential grooves, wherein a specific shape is imparted to the center blocks to provide excellent properties such as abrasion resistance. Thus, there is a need to provide a heavy duty tire having excellent abrasion resistance from environmental and other standpoints.

CITATION LIST

Patent Literature

Patent Literature 1: JP 2016-088343 A

SUMMARY OF INVENTION

Technical Problem

The present invention aims to solve the problem and provide a heavy duty pneumatic tire having excellent abrasion resistance.

Solution to Problem

The present invention relates to a heavy duty pneumatic tire, including a tread portion, the tread portion including a rubber composition containing: an isoprene rubber; a butadiene rubber; a styrene-butadiene rubber; and a carbon black having at least one of an average particle size of 20 nm or less or a cetyltrimethylammonium bromide adsorption specific surface area of 130 $m^2/g$ or more, the tread portion having a land ratio of 81% or higher.

Preferably, the rubber composition further contains a carbon black having at least one of an average particle size of more than 20 nm but not more than 25 nm or a cetyltrimethylammonium bromide adsorption specific surface area of at least 100 $m^2/g$ but less than 130 $m^2/g$.

Preferably, the rubber composition has a total styrene content of 2.0 to 11.0% by mass based on 100% by mass of a rubber component in the rubber composition.

Preferably, the rubber composition has an abrasion resistance index of 140 or higher.

Advantageous Effects of Invention

The heavy duty pneumatic tire of the present invention includes a tread portion which includes a rubber composition containing an isoprene rubber, a butadiene rubber, a styrene-butadiene rubber, and a carbon black having an average particle size of 20 nm or less and/or a cetyltrimethylammonium bromide adsorption specific surface area of 130 $m^2/g$ or more, and which has a land ratio of 81% or higher. Such a pneumatic tire exhibits significantly improved abrasion resistance.

BRIEF DESCRIPTION OF DRAWINGS

FIG. 1 shows an exemplary development diagram of a tread portion 2 of a tire 1 according to an embodiment of the present invention.

DESCRIPTION OF EMBODIMENTS

The present invention provides a heavy duty pneumatic tire including a tread portion which includes a rubber composition containing an isoprene rubber, a butadiene rubber, a styrene-butadiene rubber, and a carbon black having an average particle size of 20 nm or less and/or a cetyltrimethylammonium bromide adsorption specific surface area of 130 $m^2/g$ or more, and which has a land ratio of 81% or higher.

Thus, with a tread portion having a shape with a high land ratio and including a specific rubber composition, on-vehicle abrasion resistance is significantly improved.

As described above, the present invention provides improved (on-vehicle) abrasion resistance. The reason for this effect is not clear but may be explained as follows.

Firstly, when a styrene-butadiene rubber is blended into a conventional isoprene rubber/butadiene rubber compound, carbon black reinforcement is enhanced, thereby improving abrasion resistance. Further, incorporating a specific carbon black as reinforcing filler ensures polymer reinforcement, thereby improving abrasion resistance. In other words, it is believed that a small amount of a styrene-butadiene rubber may be dispersed in an isoprene rubber/butadiene rubber polymer matrix to form a three-phase structure (isoprene rubber/butadiene rubber/styrene-butadiene rubber), and a specific carbon black may be dispersed in the vicinity of the boundaries between the phases to strengthen the bonds between the phases, thereby allowing the rubber composition to be able to absorb impact and thus have significantly improved abrasion resistance. Further, when the land ratio is also increased to at least a predetermined proportion, tread rigidity is enhanced while ensuring energy distribution, thereby improving abrasion resistance. Due to these effects, it is believed possible to provide a tire having significantly (synergistically) improved abrasion resistance.

Next, an embodiment of the present invention will be described with reference to the drawing.

FIG. 1 shows a development diagram of a tread portion 2 of a tire 1 according to an embodiment of the present invention. The tire 1 of the present embodiment is a pneumatic tire for heavy duty use.

The tread portion 2 is provided with, for example, a plurality of main grooves 3 extending continuously in the circumferential direction of the tire. In the present embodiment, the main grooves 3 include a pair of main crown grooves 4 and 4 located on opposite sides of the tire equator C, and a pair of main shoulder grooves 5 and 5 each located between the main crown groove 4 and the tread edge Te.

The term "tread edge (Te)" is defined as the axially outermost contact position of the tire 1 determined when a normal load is applied to the tire 1 under normal conditions (i.e., the no-load tire with a normal internal pressure mounted on a normal rim) to contact a plane at a camber angle of 0 degrees. The tread width TW is defined as the distance between the opposite tread edges Te and Te in the axis direction of the tire under normal conditions. The dimensions and other characteristics of tire components are determined under normal conditions, unless otherwise stated.

The term "normal rim" refers to a rim specified for each tire by the standards in a standard system including standards according to which tires are provided, and may be, for example, "standard rim" in JATMA, "design rim" in TRA, or "measuring rim" in ETRTO.

The term "normal internal pressure" refers to an air pressure specified for each tire by the standards in a standard system including standards according to which tires are provided, and may be "maximum air pressure" in JATMA, a maximum value shown in Table "TIRE LOAD LIMITS AT VARIOUS COLD INFLATION PRESSURES" in TRA, or "inflation pressure" in ETRTO.

The term "normal load" refers to a load specified for each tire by the standards in a standard system including standards according to which tires are provided, and may be "maximum load capacity" in JATMA, a maximum value shown in Table "TIRE LOAD LIMITS AT VARIOUS COLD INFLATION PRESSURES" in TRA, or "load capacity" in ETRTO.

The main crown grooves 4 and the main shoulder grooves 5 extend continuously linearly in the tire circumferential direction. Such main grooves 3 exhibit excellent wet performance as they effectively drain water in the grooves in a direction opposite to the running direction when traveling on wet roads.

The tread portion 2 includes a pair of middle land portions 7 and 7 each defined by the main crown groove 4 and the main shoulder groove 5; one crown land portion 8 defined between the main crown grooves 4 and 4; and a pair of shoulder land portions 9 and 9 each defined between the main shoulder groove 5 and the tread edge Te.

The middle land portions 7 include horizontal middle grooves 30 connecting the main crown groove 4 to the main shoulder groove 5. Such horizontal middle grooves 30 drain smoothly a water film on the contact surfaces 7e of the middle land portions 7 into the main crown grooves 4 and the main shoulder grooves 5.

In the present embodiment, each horizontal middle groove 30 has a first portion 30a extending tire axially outward from the main crown groove 4; a second portion 30b extending tire axially inward from the main shoulder groove 5; and a third portion 30c connecting the first portion 30a to the second portion 30b. The third portion 30c is inclined at an angle greater than the angle of the first portion 30a or second portion 30b with respect to the tire axis direction. Such a third portion 30c has groove edges 30e made up of tire axis and circumferential components to improve wet performance.

Moreover, the first and second portions 30a and 30b allow the middle land portion 7 to maintain high rigidity in the tire circumferential direction.

The crown land portion 8 includes horizontal crown grooves 31 connecting the main crown grooves 4 and 4 located on opposite sides of the tire equator C. In the present embodiment, the horizontal crown grooves 31 are inclined in a direction opposite to the inclination of the horizontal middle grooves 30. As used herein, the term "groove" is defined as a groove-shaped structure having a groove width of 2 mm or more.

In view of abrasion resistance, the tread portion 2 of the tire 1 has a land ratio of 81% or higher, preferably 82% or higher, more preferably 84% or higher. In view of wet grip performance, the upper limit of the land ratio is preferably 95% or lower, more preferably 90% or lower.

The term "land ratio" refers to the ratio (Sc/Sa) of the total area Sc of the ground contact area to the total surface area Sa of an imaginary tread surface created by filling in all grooves contained within the tread width TW of the tread portion 2, as determined under normal conditions.

The tread portion 2 (middle land portions 7, crown land portion 8, shoulder land portions 9, horizontal middle grooves 30, horizontal crown grooves 31, etc.) includes a rubber composition which contains: a rubber component including an isoprene rubber, a butadiene rubber, and a styrene-butadiene rubber; and a carbon black having an average particle size of 20 nm or less and/or a cetyltrimethylammonium bromide adsorption specific surface area of 130 $m^2/g$ or more.

The isoprene rubber may be any polymer mainly having an isoprene-based unit (isoprene unit or isoprene derivative unit (e.g., epoxidized isoprene unit)). Examples include polyisoprene rubber (IR), epoxidized polyisoprene rubber, hydrogenated polyisoprene rubber, grafted polyisoprene rubber, natural rubber (NR), deproteinized natural rubber (DPNR), highly purified natural rubber (UPNR), epoxidized natural rubber (ENR), hydrogenated natural rubber (HNR), and grafted natural rubber. These may be used alone or in combinations of two or more. The isoprene rubber has an isoprene-based unit content, based on 100% by mass of the rubber, of, for example, 95% by mass or more. The isoprene-based unit content may be 98% by mass or more or 100% by mass.

The amount of the isoprene rubber based on 100% by mass of the rubber component in the rubber composition is preferably 5% by mass or more, more preferably 10% by mass or more, still more preferably 15% by mass or more. The upper limit of the amount is preferably 50% by mass or less, more preferably 40% by mass or less, still more preferably 35% by mass or less. When the amount is within the range indicated above, good abrasion resistance tends to be obtained.

The styrene-butadiene rubber (SBR) may be any rubber containing a styrene-based unit (styrene unit or styrene derivative unit) and a butadiene-based unit (butadiene unit or butadiene derivative unit). Examples include emulsion-polymerized styrene-butadiene rubber (E-SBR) and solution-polymerized styrene-butadiene rubber (S-SBR). The styrene-butadiene rubber has a combined content of styrene-based and butadiene-based units, based on 100% by mass of the rubber, of, for example, 95% by mass or more. The combined content may be 98% by mass or more or 100% by mass. These styrene-butadiene rubbers may be used alone or in combinations of two or more.

The styrene-butadiene rubber may be an unmodified or modified SBR. The modified SBR may be any SBR having a functional group interactive with a filler such as silica. For example, it may be a chain end-modified SBR obtained by modifying at least one chain end of SBR with a compound (modifier) having the functional group (chain end-modified SBR terminated with the functional group); a backbone-modified SBR having the functional group in the backbone; a backbone- and chain end-modified SBR having the functional group in both the backbone and chain end (e.g., a backbone- and chain end-modified SBR in which the backbone has the functional group and at least one chain end is modified with the modifier); or a chain end-modified SBR that has been modified (coupled) with a polyfunctional compound having two or more epoxy groups in the molecule so that a hydroxyl or epoxy group is introduced.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxyl, oxy, and epoxy groups. These functional groups may be substituted.

Preferred among these are amino (preferably amino whose hydrogen atom is replaced with a C1-C6 alkyl group), alkoxy (preferably C1-C6 alkoxy), alkoxysilyl (preferably C1-C6 alkoxysilyl), and amide groups.

Examples of the modifier for the modified SBR include: polyglycidyl ethers of polyols such as ethylene glycol diglycidyl ether, glycerol triglycidyl ether, trimethylolethane triglycidyl ether, and trimethylolpropane triglycidyl ether; polyglycidyl ethers of aromatic compounds having two or more phenol groups such as diglycidylated bisphenol A; polyepoxy compounds such as 1,4-diglycidylbenzene, 1,3, 5-triglycidylbenzene, and polyepoxidized liquid polybutadiene; epoxy group-containing tertiary amines such as 4,4'-diglycidyl-diphenylmethylamine and 4,4'-diglycidyl-dibenzylmethylamine; diglycidylamino compounds such as diglycidylaniline, N,N'-diglycidyl-4-glycidyloxyaniline, diglycidylorthotoluidine, tetraglycidyl meta-xylenediamine, tetraglycidylaminodiphenylmethane, tetraglycidyl-p-phenylenediamine, diglycidylaminomethylcyclohexane, and tetraglycidyl-1,3-bisaminomethylcyclohexane;

amino group-containing acid chlorides such as bis(1-methylpropyl)carbamyl chloride, 4-morpholinecarbonyl chloride, 1-pyrrolidinecarbonyl chloride, N,N-dimethylcarbamic acid chloride, and N,N-diethylcarbamic acid chloride; epoxy group-containing silane compounds such as 1,3-bis (glycidyloxypropyl)-tetramethyldisiloxane and (3-glycidyloxypropyl)-pentamethyldisiloxane;

sulfide group-containing silane compounds such as (trimethylsilyl) [3-(trimethoxysilyl)propyl]sulfide, (trimethylsilyl) [3-(triethoxysilyl)propyl]sulfide, (trimethylsilyl) [3-(tripropoxysilyl)propyl]sulfide, (trimethylsilyl)[3-(tributoxysilyl)propyl]sulfide, (trimethylsilyl)[3-(methyldimethoxysilyl)propyl]sulfide, (trimethylsilyl)[3-(methyldiethoxysilyl)propyl]sulfide, (trimethylsilyl)[3-(methyldipropoxysilyl)propyl]sulfide, and (trimethylsilyl) [3-(methyldibutoxysilyl)propyl]sulfide;

N-substituted aziridine compounds such as ethyleneimine and propyleneimine; alkoxysilanes such as methyltriethoxysilane, N,N-bis(trimethylsilyl)-3-aminopropyltrimethoxysilane, N,N-bis(trimethylsilyl)-3-aminopropyltriethoxysilane, N,N-bis(trimethylsilyl)aminoethyltrimethoxysilane, and N,N-bis(trimethylsilyl)aminoethyltriethoxysilane; (thio)benzophenone compounds containing amino and/or substituted amino groups such as 4-N,N-dimethylaminobenzophenone, 4-N,N-di-t-butylaminobenzophenone, 4-N,N-diphenylaminobenzophenone, 4,4'-bis(dimethylamino)benzophenone, 4,4'-bis(diethylamino)benzophenone, 4,4'-bis (diphenylamino)benzophenone, and N,N,N',N'-bis (tetraethylamino)benzophenone; benzaldehyde compounds containing amino and/or substituted amino groups such as 4-N,N-dimethylaminobenzaldehyde, 4-N,N-diphenylaminobenzaldehyde, and 4-N,N-divinylaminobenzaldehyde; N-substituted pyrrolidones such as N-methyl-2-pyrrolidone, N-vinyl-2-pyrrolidone, N-phenyl-2-pyrrolidone, N-t-butyl-2-pyrrolidone, and N-methyl-5-methyl-2-pyrrolidone; N-substituted piperidones such as N-methyl-2-piperidone, N-vinyl-2-piperidone, and N-phenyl-2-piperidone; N-substituted lactams such as N-methyl-ε-caprolactam, N-phenyl-ε-caprolactam, N-methyl-ω-laurilolactam, N-vinyl-ω-laurilolactam, N-methyl-β-propiolactam, and N-phenyl-β-propiolactam; and N,N-bis(2,3-epoxypropoxy)-aniline, 4,4-methylene-bis (N,N-glycidylaniline), tris(2,3-epoxypropyl)-1,3,5-triazine-2,4,6-triones, N,N-diethylacetamide, N-methylmaleimide, N,N-diethylurea, 1,3-dimethylethyleneurea, 1,3-divinylethyleneurea, 1,3-diethyl-2-imidazolidinone, 1-methyl-3-ethyl-2-imidazolidinone, 4-N,N-dimethylaminoacetophenone, 4-N,N-diethylaminoacetophenone, 1,3-bis(diphenylamino)-2-propanone, and 1,7-bis(methylethylamino)-4-heptanone.

The modification with the compound (modifier) can be performed by known methods.

Commercial products manufactured or sold by Sumitomo Chemical Co., Ltd., JSR Corporation, Asahi Kasei Corporation, Zeon Corporation, etc. may be used as the styrene-butadiene rubber.

The styrene-butadiene rubber preferably has a styrene content of 5% by mass or higher, more preferably 10% by mass or higher, still more preferably 15% by mass or higher, particularly preferably 20% by mass or higher. The styrene content is also preferably 60% by mass or lower, more preferably 40% by mass or lower, still more preferably 30% by mass or lower, particularly preferably 25% by mass or lower. When the styrene content is within the range indicated above, good abrasion resistance and heat build-up resistance tend to be obtained. The styrene content of the styrene-butadiene rubber is determined by $^1$H-NMR.

The amount of the styrene-butadiene rubber based on 100% by mass of the rubber component in the rubber composition is preferably 5% by mass or more, more preferably 15% by mass or more, still more preferably 20% by mass or more, particularly preferably 25% by mass or more. When the amount is not less than the lower limit, good abrasion resistance tends to be obtained. The upper limit of the amount is preferably 60% by mass or less, more preferably 50% by mass or less, still more preferably 45% by mass or less, particularly preferably 35% by mass or less. If a large amount of styrene-butadiene rubber is used, heat build-up resistance may deteriorate. However, when the amount is not more than the upper limit, the deterioration in heat build-up resistance tends to be reduced.

The butadiene rubber (BR) may be any polymer mainly having a butadiene-based unit (butadiene unit or butadiene derivative unit). Examples include high-cis BR, low-cis BR, and BR containing syndiotactic polybutadiene crystals. These may be used alone or in combinations of two or more. The butadiene rubber has a butadiene-based unit content, based on 100% by mass of the rubber, of, for example, 95% by mass or more. The butadiene-based unit content may be 98% by mass or more or 100% by mass. Any rubber containing both a butadiene-based unit and a styrene-based unit corresponds to the styrene-butadiene rubber and not to the butadiene rubber.

The BR preferably has a cis content of 90% by mass or higher, more preferably 95% by mass or higher, still more preferably 98% by mass or higher. The upper limit of the cis content is not limited. When the cis content is within the range indicated above, the advantageous effects tend to be better achieved.

The cis content of the BR can be measured by infrared absorption spectrometry.

The butadiene rubber may be an unmodified or modified BR. The modified BR may be a modified BR into which any of the above-mentioned functional groups is introduced.

Commercial products available from Ube Industries, Ltd., JSR Corporation, Asahi Kasei Corporation, Zeon Corporation, etc. may be used as the butadiene rubber.

The amount of the butadiene rubber based on 100% by mass of the rubber component is preferably 10% by mass or more, more preferably 20% by mass or more, still more preferably 30% by mass or more. The upper limit of the amount is preferably 60% by mass or less, more preferably 50% by mass or less, still more preferably 45% by mass or less. When the amount is within the range indicated above, good abrasion resistance tends to be obtained, and processability also tends to be ensured easily.

The rubber component in the rubber composition may include additional rubbers other than the isoprene rubber, butadiene rubber, and styrene-butadiene rubber. Examples of additional rubbers that may be used include diene rubbers such as styrene-isoprene-butadiene rubber (SIBR), ethylene-propylene-diene rubber (EPDM), chloroprene rubber (CR), acrylonitrile butadiene rubber (NBR), and butyl rubber (IIR). These rubbers may be used alone or in combinations of two or more.

The total styrene content (total amount of styrene in the total rubber component) of the rubber composition, based on 100% by mass of the rubber component, is preferably 2.0% by mass or higher, more preferably 4.0% by mass or higher, still more preferably 6.0% by mass or higher. The upper limit of the total styrene content is preferably 11.0% by mass or lower, more preferably 10.0% by mass or lower, still more preferably 9.0% by mass or lower. When the total styrene content is within the range indicated above, good abrasion resistance and heat build-up resistance tend to be obtained.

The total styrene content (% by mass) based on 100% by mass of the rubber component is Σ[(amount (% by mass) of each styrene-containing rubber)×(styrene content (% by mass) of each styrene-containing rubber)/100]. For example, in the case of a rubber component consisting of 30% by mass of NR, 30% by mass of SBR (styrene content: 23.5% by mass), and 40% by mass of BR, the total styrene content based on 100% by mass of the rubber component is 7.05% by mass (=30×23.5/100).

The rubber composition contains a carbon black having an average particle size of 20 nm or less and/or a cetyltrimethylammonium bromide adsorption specific surface area (CTAB) of 130 $m^2/g$ or more (also referred to as carbon black (A)).

In view of abrasion resistance, the carbon black (A) preferably has an average particle size of 20 nm or less, more preferably 17 nm or less, still more preferably 15 nm or less. The lower limit of the average particle size is not limited, but in view of properties such as dispersibility, it is preferably 5 nm or more, more preferably 10 nm or more.

The average particle size of the carbon black refers to the number average particle size determined by transmission electron microscopy.

In view of abrasion resistance, the carbon black (A) preferably has a CTAB of 130 $m^2/g$ or more, more preferably 140 $m^2/g$ or more, still more preferably 145 $m^2/g$ or more, particularly preferably 150 $m^2/g$ or more. The upper limit of the CTAB is not limited, but in view of properties such as dispersibility, it is preferably 250 $m^2/g$ or less, more preferably 200 $m^2/g$ or less, still more preferably 180 $m^2/g$ or less.

As used herein, the CTAB of the carbon black is measured in accordance with JIS K6217-3:2001.

In view of abrasion resistance, the carbon black (A) preferably has a nitrogen adsorption specific surface area ($N_2SA$) of 125 $m^2/g$ or more, more preferably 145 $m^2/g$ or more, still more preferably 150 $m^2/g$ or more, particularly preferably 155 $m^2/g$ or more. The upper limit of the $N_2SA$ is not limited, but in view of properties such as dispersibility, it is preferably 250 $m^2/g$ or less, more preferably 200 $m^2/g$ or less, still more preferably 180 $m^2/g$ or less.

The $N_2SA$ of the carbon black is determined in accordance with JIS K6217-2:2001.

In view of abrasion resistance, the carbon black (A) preferably has an iodine adsorption number (IA, mg/g) of 120 mg/g or more, more preferably 125 mg/g or more, still more preferably 130 mg/g or more, particularly preferably 140 mg/g or more. The upper limit of the IA is not limited, but in view of properties such as dispersibility, it is preferably 200 mg/g or less, more preferably 180 mg/g or less, still more preferably 160 mg/g or less.

As used herein, the iodine adsorption number (IA) of the carbon black is measured in accordance with JIS K6217-1:2001.

In view of abrasion resistance, the carbon black (A) preferably has a ratio (CTAB/IA) of the cetyltrimethylammonium bromide adsorption specific surface area (CTAB) to the iodine adsorption number (IA, mg/g) of 0.85 to 1.35 $m^2/mg$, more preferably 0.92 to 1.30 $m^2/mg$, still more preferably 1.00 to 1.25 $m^2/mg$.

The surface activity index defined by CTAB/IA may be taken as an index of crystallinity (graphitization degree) of carbon black. Specifically, a higher CTAB/IA ratio indicates a lower crystallinity which tends to lead to a greater interaction between the carbon black and the rubber component. The CTAB/IA ratio may also be used as a parameter to assess the number of acidic functional groups present on the carbon black surface. The acidic functional groups on the carbon black surface contribute to the interaction with the rubber component. A higher CTAB/IA ratio indicates a larger number of acidic functional groups present on the carbon black surface. Thus, when the CTAB/IA ratio is within the range indicated above, the carbon black can have a more significant reinforcing effect on the rubber component, thereby resulting in excellent abrasion resistance.

In view of abrasion resistance, the carbon black (A) preferably has a dibutyl phthalate absorption (DBP) of 120 $cm^3/100$ g or more, more preferably 125 $cm^3/100$ g or more, still more preferably 135 $cm^3/100$ g or more. The upper limit of the DBP is not limited, but in view of properties such as dispersibility, it is preferably 180 $cm^3/100$ g or less, more preferably 170 $cm^3/100$ g or less, still more preferably 160 $cm^3/100$ g or less.

The DBP of the carbon black is measured in accordance with JIS K6217-4:2001.

Examples of the carbon black (A) include SAF. These carbon blacks may be used alone or in combinations of two or more. Moreover, the carbon black (A) may be prepared as described in, for example, JP 2000-319539 A or JP H08-507555 T, both of which are incorporated herein by reference.

The amount of the carbon black (A) per 100 parts by mass of the rubber component is preferably 5 parts by mass or more, more preferably 10 parts by mass or more, still more preferably 15 parts by mass or more. When the amount is not less than the lower limit, good abrasion resistance tends to be obtained. In view of properties such as dispersibility, the amount is also preferably 70 parts by mass or less, more preferably 60 parts by mass or less, still more preferably 50 parts by mass or less, particularly preferably 30 parts by mass or less.

The rubber composition preferably further contains a carbon black other than the carbon black (A) (also referred to as additional carbon black). In this case, abrasion resistance can be synergistically improved.

The additional carbon black may suitably be, for example, a carbon black having an average particle size of more than 20 nm but not more than 25 nm and/or a cetyltrimethylammonium bromide adsorption specific surface area (CTAB) of at least 100 m²/g but less than 130 m²/g (also referred to as carbon black (B)).

The average particle size of the carbon black (B) is more than 20 nm but not more than 25 nm. In view of properties such as dispersibility, the lower limit is preferably 21 nm or more. In view of abrasion resistance, the upper limit is preferably 24 nm or less, more preferably 23 nm or less.

In view of abrasion resistance, the CTAB of the carbon black (B) is preferably 105 m²/g or more, more preferably 110 m²/g or more. The upper limit is not limited, but in view of properties such as dispersibility, it is preferably 125 m²/g or less, more preferably 120 m²/g or less.

The average particle size and CTAB of the additional carbon black (e.g., carbon black (B)) can be measured as described above.

The amount of the carbon black (B) per 100 parts by mass of the rubber component is preferably 10 parts by mass or more, more preferably 20 parts by mass or more, still more preferably 30 parts by mass or more. When the amount is not less than the lower limit, good abrasion resistance tends to be obtained. In view of properties such as dispersibility, the amount is also preferably 100 parts by mass or less, more preferably 70 parts by mass or less, still more preferably 60 parts by mass or less.

Examples of the additional carbon black include, but are not limited to, N220, N234, N219, N339, N330, N326, N351, N550, and N762. Commercial products available from Asahi Carbon Co., Ltd., Cabot Japan K.K., Tokai Carbon Co., Ltd., Mitsubishi Chemical Corporation, Lion Corporation, NSCC Carbon Co., Ltd., Columbia Carbon, etc. may be used. These may be used alone or in combinations of two or more. N220 is particularly preferred in view of abrasion resistance and cost.

The amount of carbon black (the combined amount of the carbon black (A) and the additional carbon black) per 100 parts by mass of the rubber component is preferably 20 parts by mass or more, more preferably 40 parts by mass or more, still more preferably 45 parts by mass or more, particularly preferably 50 parts by mass or more. When the amount is not less than the lower limit, good abrasion resistance tends to be obtained. In view of properties such as dispersibility, the amount is also preferably 150 parts by mass or less, more preferably 100 parts by mass or less, still more preferably 80 parts by mass or less, particularly preferably 70 parts by mass or less.

The amount of the carbon black (A) based on 100% by mass of the total carbon black is preferably 5% by mass or more, more preferably 20% by mass or more, still more preferably 25% by mass or more. The upper limit of the amount is preferably 80% by mass or less, more preferably 60% by mass or less, still more preferably 50% by mass or less. When the amount is within the range indicated above, good abrasion resistance tends to be obtained.

The rubber composition may contain silica.

In the rubber composition containing silica, the amount of the silica per 100 parts by mass of the rubber component is preferably 3.0 parts by mass or more, preferably 5.0 parts by mass or more, in view of grip performance. The amount is also preferably 30 parts by mass or less, more preferably 20 parts by mass or less, still more preferably 15 parts by mass or less.

The silica preferably has a nitrogen adsorption specific surface area ($N_2SA$) of 80 m²/g or more, more preferably 115 m²/g or more, still more preferably 150 m²/g or more. When the $N_2SA$ is not less than the lower limit, good grip performance tends to be obtained. The $N_2SA$ is also preferably 400 m²/g or less, more preferably 270 m²/g or less, still more preferably 250 m²/g or less. When the $N_2SA$ is not more than the upper limit, good silica dispersibility tends to be obtained.

The $N_2SA$ of the silica is measured by the BET method in accordance with ASTM D3037-93.

Examples of the silica include, but are not limited to, dry silica (anhydrous silica) and wet silica (hydrous silica). Wet silica (hydrous silica) is preferred because it contains a large number of silanol groups. Commercial products available from Degussa, Tosoh Silica Corporation, Solvay Japan, Tokuyama Corporation, etc. may be used. These may be used alone or in combinations of two or more.

The rubber composition may contain additional fillers other than the carbon black and silica. Examples of such additional fillers include calcium carbonate, talc, alumina, clay, aluminum hydroxide, and mica.

When the rubber composition contains silica, it preferably contains a silane coupling agent together with the silica.

Any silane coupling agent conventionally used in combination with silica in the rubber industry can be used, and examples include, but are not limited to: sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(2-triethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane, 2-mercaptoethyltriethoxysilane, and NXT and NXT-Z both available from Momentive; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. Commercial products available from Degussa, Momentive, Shin-Etsu Silicone, Tokyo Chemical Industry Co., Ltd., AZmax. Co., Dow Corning Toray Co., Ltd., etc. may be used. These may be used alone or in combinations of two or more. Preferred among these are sulfide or mercapto silane coupling agents.

In the rubber composition containing a silane coupling agent, the amount of the silane coupling agent per 100 parts by mass of the silica is preferably 2 parts by mass or more, more preferably 5 parts by mass or more. When the amount is not less than the lower limit, the added silane coupling agent tends to produce its effect. The amount is also preferably 20 parts by mass or less, more preferably 15 parts by mass or less. When the amount is not more than the upper limit, an effect commensurate with the added amount and good processability during kneading tend to be obtained.

The rubber composition may contain a softener (softener that is liquid at room temperature (25° C.)) such as an oil or a liquid diene polymer.

Examples of the oil include process oils such as paraffinic, aromatic, and naphthenic process oils.

The liquid diene polymer preferably has a polystyrene equivalent weight average molecular weight (Mw) of $1.0 \times 10^3$ to $2.0 \times 10^5$, more preferably $3.0 \times 10^3$ to $1.5 \times 10^4$, as measured by gel permeation chromatography (GPC). When the Mw is not less than the lower limit, good abrasion resistance and tensile properties tend to be obtained, thereby ensuring sufficient durability, while when the Mw is not more than the upper limit, the polymer solution tends to have a good viscosity, resulting in excellent productivity.

In the present invention, the Mw of the liquid diene polymer is determined by gel permeation chromatography (GPC) relative to polystyrene standards.

Examples of the liquid diene polymer include liquid styrene-butadiene copolymers (liquid SBR), liquid polybutadiene polymers (liquid BR), liquid polyisoprene polymers (liquid IR), liquid styrene-isoprene copolymers (liquid SIR), liquid styrene-butadiene-styrene block copolymers (liquid SBS block polymers), liquid styrene-isoprene-styrene block copolymers (liquid SIS block polymers), liquid farnesene polymers, and liquid farnesene butadiene copolymers. The chain end or backbone of these polymers may be modified with polar groups. Preferred among these is liquid IR or liquid SBR.

In view of abrasion resistance, the amount of the softener (the total softener) per 100 parts by mass of the rubber component in the rubber composition is preferably 1.0 to 50 parts by mass, more preferably 2.0 to 30 parts by mass, still more preferably 2.0 to 20 parts by mass, particularly preferably 2.0 to 10 parts by mass. Herein, the amount of the softener includes the amount of the oil contained in oil extended rubber.

The rubber composition may contain a resin that is solid at room temperature (25° C.). The amount of the resin per 100 parts by mass of the rubber component is preferably 3 to 50 parts by mass, more preferably 7 to 40 parts by mass.

Examples of the resin include aromatic vinyl polymers, coumarone-indene resins, indene resins, rosin resins, terpene resins, and acrylic resins. Commercial products available from Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JX energy, Arakawa Chemical Industries, Ltd., Taoka Chemical Co., Ltd., Toagosei Co., Ltd., etc. may be used. These may be used alone or in combinations of two or more. Preferred among these are aromatic vinyl polymers, coumarone-indene resins, terpene resins, and rosin resins.

Examples of the aromatic vinyl polymers include resins produced by polymerization of α-methylstyrene and/or styrene, such as styrene homopolymers, α-methylstyrene homopolymers, and copolymers of α-methylstyrene and styrene. Preferred among these are copolymers of α-methylstyrene and styrene.

The term "coumarone-indene resins" refers to resins that contain coumarone and indene as main monomer components forming the skeleton (backbone) of the resins. Examples of monomer components other than coumarone and indene which may be contained in the skeleton include styrene, α-methylstyrene, methylindene, and vinyltoluene.

The term "indene resins" refers to resins that contain indene as a main monomer component forming the skeleton (backbone) of the resins.

The rosin resins (rosins) can be classified based on whether they are modified or not into non-modified rosins (unmodified rosins) and modified rosins (rosin derivatives). Examples of the non-modified rosins include tall rosins (synonym: tall oil rosins), gum rosins, and wood rosins. The term "modified rosins" refers to modified products of non-modified rosins, and examples include disproportionated rosins, polymerized rosins, hydrogenated rosins, and other chemically-modified rosins such as rosin esters, unsaturated carboxylic acid-modified rosins, unsaturated carboxylic acid-modified rosin esters, rosin amide compounds, and rosin amine salts.

Rosin resins having a carboxyl content that is not excessively high and an appropriate acid number are preferred. Specifically, the acid number of the rosin resins is usually more than 0 mg KOH/g, but, for example, not more than 200 mg KOH/g, preferably not more than 100 mg KOH/g, more preferably not more than 30 mg KOH/g, still more preferably not more than 10 mg KOH/q.

The acid number can be measured as described later in EXAMPLES. Rosins, e.g. having an excessively high acid number, may be subjected to known esterification processes to reduce their carboxyl content and adjust their acid number to the range indicated above.

Examples of the terpene resins include polyterpene resins produced by polymerization of terpene compounds, and aromatic modified terpene resins produced by polymerization of terpene compounds and aromatic compounds. Hydrogenated products of the foregoing resins may also be used.

The term "polyterpene resins" refers to resins produced by polymerization of terpene compounds. The term "terpene compounds" refers to hydrocarbons having a composition represented by $(C_5H_8)_n$ and oxygen-containing derivatives thereof, which have a terpene backbone and are classified into monoterpenes ($C_{10}H_{16}$), sesquiterpenes ($C_{15}H_{24}$), diterpenes ($C_{20}H_{32}$), etc. Examples of such terpene compounds include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol.

Examples of the polyterpene resins include resins made from the above-mentioned terpene compounds, such as pinene resins, limonene resins, dipentene resins, and pinene-limonene resins. Among these, pinene resins are preferred because their polymerization reaction is simple, and they are made from natural pine resin and therefore inexpensive. Pinene resins, which usually contain two isomers, i.e. α-pinene and β-pinene, are classified into β-pinene resins mainly containing β-pinene and α-pinene resins mainly containing α-pinene, depending on the proportions of the components in the resins.

Examples of the aromatic modified terpene resins include terpene phenol resins made from the above-mentioned terpene compounds and phenolic compounds, and terpene styrene resins made from the above-mentioned terpene compounds and styrene compounds. Terpene phenol styrene resins made from the terpene compounds, phenolic compounds, and styrene compounds may also be used. Examples of the phenolic compounds include phenol, bisphenol A, cresol, and xylenol. Examples of the styrene compounds include styrene and α-methylstyrene.

The rubber composition preferably contains sulfur (sulfur vulcanizing agent).

Examples of the sulfur include those commonly used in the rubber industry, such as powdered sulfur, precipitated sulfur, colloidal sulfur, insoluble sulfur, highly dispersible sulfur, and soluble sulfur. Commercial products available from Tsurumi Chemical Industry Co., Ltd., Karuizawa Sulfur Co., Ltd., Shikoku Chemicals Corporation, Flexsys, Nippon Kanryu Industry Co., Ltd., Hosoi Chemical Industry Co., Ltd., etc. may be used. These may be used alone or in combinations of two or more.

The amount of the sulfur (sulfur vulcanizing agent) per 100 parts by mass of the rubber component is preferably 0.3 parts by mass or more, more preferably 0.5 parts by mass or more, still more preferably 1.0 part by mass or more. When the amount is not less than the lower limit, good abrasion resistance tends to be obtained. The upper limit of the amount is not limited, but it is preferably 5.0 parts by mass or less, more preferably 3.0 parts by mass or less, still more preferably 2.5 parts by mass or less, particularly preferably 2.0 parts by mass or less.

The rubber composition preferably contains a vulcanization accelerator.

Examples of the vulcanization accelerator include thiazole vulcanization accelerators such as 2-mercaptobenzothiazole, di-2-benzothiazolyl disulfide (DM, 2,2'-dibenzothiazolyl disulfide), and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl) thiuram disulfide (TOT-N); sulfenamide vulcanization accelerators such as N-cyclohexyl-2-benzothiazole sulfenamide, N-t-butyl-2-benzothiazolyl sulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These may be used alone or in combinations of two or more. Preferred among these are sulfenamide or guanidine vulcanization accelerators.

In view of properties such as vulcanized properties, the amount of the vulcanization accelerator per 100 parts by mass of the rubber component is preferably 0.5 parts by mass or more, more preferably 1.0 part by mass or more. The amount is also preferably 8.0 parts by mass or less, more preferably 5.0 parts by mass or less, still more preferably 3.0 parts by mass or less.

The rubber composition may contain a wax.

Examples of the wax include, but are not limited to, petroleum waxes such as paraffin waxes and microcrystalline waxes; naturally-occurring waxes such as plant waxes and animal waxes; and synthetic waxes such as polymers of ethylene, propylene, or other similar monomers. Commercial products available from Ouchi Shinko Chemical Industrial Co., Ltd., Nippon Seiro Co., Ltd., Seiko Chemical Co., Ltd., etc. may be used. These may be used alone or in combinations of two or more. Among these, petroleum waxes are preferred, with paraffin waxes being more preferred.

The amount of the wax per 100 parts by mass of the rubber component is preferably 0.5 parts by mass or more, more preferably 1 part by mass or more, but is preferably 10 parts by mass or less, more preferably 6 parts by mass or less.

The rubber composition may contain an antioxidant.

Examples of the antioxidant include, but are not limited to: naphthylamine antioxidants such as phenyl-α-naphthylamine; diphenylamine antioxidants such as octylated diphenylamine and 4,4'-bis(α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis-[methylene-3-(3',5'-di-t-butyl-4'-hydroxyphenyl)propionate]methane. Commercial products available from Seiko Chemical Co., Ltd., Sumitomo Chemical Co., Ltd., Ouchi Shinko Chemical Industrial Co., Ltd., Flexsys, etc. may be used. These may be used alone or in combinations of two or more. Preferred among these are p-phenylenediamine antioxidants, more preferably N-(1,3-dimethylbutyl)-N'-phenyl-p-phenylenediamine.

The amount of the antioxidant per 100 parts by mass of the rubber component is preferably 0.3 parts by mass or more, more preferably 1 part by mass or more, but is preferably 7 parts by mass or less, more preferably 6 parts by mass or less, still more preferably 5 parts by mass or less.

The rubber composition may contain a fatty acid, particularly stearic acid.

The stearic acid may be a conventional one, and examples include commercial products available from NOF Corporation, Kao Corporation, FUJIFILM Wako Pure Chemical Corporation, and Chiba Fatty Acid Co., Ltd.

The amount of the fatty acid per 100 parts by mass of the rubber component is preferably 0.5 parts by mass or more, more preferably 1 part by mass or more, still more preferably 2.5 parts by mass or more. The amount is also preferably 10 parts by mass or less, more preferably 5 parts by mass or less.

The rubber composition may contain zinc oxide.

The zinc oxide may be a conventional one, and examples include commercial products available from Mitsui Mining & Smelting Co., Ltd., Toho Zinc Co., Ltd., HakusuiTech Co., Ltd., Seido Chemical Industry Co., Ltd., and Sakai Chemical Industry Co., Ltd.

The amount of the zinc oxide per 100 parts by mass of the rubber component is preferably 0.5 parts by mass or more, more preferably 1 part by mass or more. The amount is also preferably 5 parts by mass or less, more preferably 4 parts by mass or less.

In addition to the above components, the rubber composition may contain additives commonly used in the tire industry, such as surfactants.

The rubber composition can be prepared by known methods, such as by kneading the components using a rubber kneading machine such as an open roll mill, a Banbury mixer, or a kneader, and then vulcanizing the kneaded mixture.

The kneading conditions are as follows. In a base kneading step of kneading additives other than crosslinking agents (vulcanizing agents) and vulcanization accelerators, the kneading temperature is usually 100 to 180° C., preferably 120 to 170° C. In a final kneading step of kneading vulcanizing agents and vulcanization accelerators, the kneading temperature is usually 120° C. or lower, and preferably 85 to 110° C. The composition obtained after kneading vulcanizing agents and vulcanization accelerators is usually vulcanized by, for example, press vulcanization. The vulcanization temperature is usually 140 to 190° C., preferably 150 to 185° C.

The rubber composition (vulcanized rubber composition) preferably has an abrasion resistance index of 140 or higher. A higher abrasion resistance index is more preferred, and the abrasion resistance index is more preferably 150 or higher, still more preferably 160 or higher.

The abrasion resistance index is determined as described later in EXAMPLES.

The heavy duty pneumatic tire of the present invention can be produced using the rubber composition by usual methods. Specifically, the unvulcanized rubber composition containing the components may be extruded into the shape of, for example, a tread (a component that contacts the road such as a monolayer tread or a cap tread of a multi-layer tread) and assembled with other tire components on a tire building machine in a usual manner to build an unvulcanized tire, which may then be heated and pressurized in a vulcanizer to obtain a tire. The tire may be used in trucks and buses or other heavy duty vehicles.

EXAMPLES

The present invention is specifically described with reference to examples, but the present invention is not limited to the examples.

Production Example 1

A fine particle carbon black 1 was produced by the method of Example 3 of JP H08-507555 T.

Production Example 2

A fine particle carbon black 2 was produced using class C heavy oil as a fuel and creosote oil as a feedstock hydrocarbon under set conditions in a carbon black reaction furnace in which a combustion zone, a feedstock introduction zone, and a rear reaction zone were joined in sequence. The combustion zone had an inner diameter of 800 mm and a length of 1600 mm and was provided with an air inlet duct and a combustion burner. The feedstock introduction zone was connected to the combustion zone and included a narrow portion with an inner diameter of 145 mm and a length of 1000 mm provided with a feedstock nozzle penetrating into the portion from the periphery. The rear reaction zone had an inner diameter of 400 mm and a length of 3000 mm and was provided with a quenching device.

The chemicals used in the examples and comparative examples are listed below.

NR: TSR20

SBR: SBR1502 available from Sumitomo Chemical Co., Ltd. (styrene content: 23.5% by mass)

BR: BR150B available from Ube Industries, Ltd. (cis content: 95% by mass)

Fine particle carbon black 1: Production Example 1 (average particle size: 16 nm, CTAB: 170 m$^2$/g, N$_2$SA: 174 m$^2$/g, IA: 163 mg/g, CTAB/IA: 1.04, DBP: 154 cm$^3$/100 g)

Fine particle carbon black 2: Production Example 2 (average particle size: 16 nm, CTAB: 158 m$^2$/g, N$_2$SA: 170 m$^2$/g, IA: 145 mg/g, CTAB/IA: 1.09, DBP: 138 cm$^3$/100 g)

Fine particle carbon black 3: N134 (average particle size: 18 nm, CTAB: 130 m$^2$/g, N$_2$SA: 148 m$^2$/g, IA: 144 mg/g, CTAB/IA: 0.90, DBP: 123 cm$^3$/100 g)

Carbon black 4: N220 (average particle size: 22 nm, CTAB: 115 m$^2$/g, N$_2$SA: 115 m$^2$/g, IA: 118 mg/g, CTAB/IA: 0.97, DBP: 113 cm$^3$/100 g)

Wax: Ozoace 0355 available from Nippon Seiro Co., Ltd.

Antioxidant: NOCRAC 6C (N-(1,3-dimethylbutyl)-N'-phenyl-p-phenylenediamine) available from Ouchi Shinko Chemical Industrial Co., Ltd.

Stearic acid: stearic acid available from NOF Corporation

Zinc oxide: zinc oxide #2 available from Mitsui Mining & Smelting Co., Ltd.

Oil: TDAE oil available from Japan Energy Corporation

Sulfur: powdered sulfur available from Tsurumi Chemical Industry Co., Ltd.

Vulcanization accelerator: NOCCELER NS (N-tert-butyl-2-benzothiazyl sulfenamide) available from Ouchi Shinko Chemical Industrial Co., Ltd.

Examples and Comparative Examples

The chemicals other than the sulfur and vulcanization accelerator in the amounts shown in Table 1 were kneaded using a 1.7 L Banbury mixer (Kobe Steel, Ltd.) at 150° C. for 5 minutes to give a kneaded mixture. Then, the sulfur and vulcanization accelerator were added to the kneaded mixture, and they were kneaded using an open roll mill at 60° C. for 5 minutes to give an unvulcanized rubber composition.

The unvulcanized rubber composition was press-vulcanized at 150° C. for 35 minutes to obtain a vulcanized rubber sheet.

The unvulcanized rubber composition was also formed into a tread shape according to the land ratio shown in Table 1 and assembled with other tire components to build an unvulcanized tire, which was then press-vulcanized at 15° C. for 20 minutes to prepare a test tire (size: 225/70R19.5 for heavy duty use) having a basic pattern as shown in FIG. 1.

The test tires and vulcanized rubber sheets prepared as above were evaluated as follows. Table 1 shows the results.

<Abrasion Resistance (Vulcanized Rubber Composition)>

The volume loss of the vulcanized rubber sheets (vulcanized rubber compositions) was measured with a laboratory abrasion and skid tester (LAT tester) (rubber abrasion tester "LAT100" available from Heisen Yoko Co., Ltd.) at a load of 40 N, a speed of 20 km/h, and a slip angle of 6 degrees. Abrasion resistance indexes of the compositions were calculated by the following equation, where the volume loss of the rubber composition of Comparative Example 1 was assigned an index of 100. A higher index indicates better abrasion resistance. (Abrasion resistance index)=(volume loss of composition of Comparative Example 1)/(volume loss of each composition)×100

<Heat Build-Up Resistance>

The tan δ of the vulcanized rubber sheets (vulcanized rubber compositions) was measured using a spectrometer (Ueshima Seisakusho Co., Ltd.) at a dynamic strain amplitude of 1%, a frequency of 10 Hz, and a temperature of 50° C. The reciprocals of the tan δ values are expressed as an index (heat build-up index), with Comparative Example 2 taken as 100. A higher index indicates less heat build-up and better heat build-up resistance.

<Abrasion Resistance (on Vehicle)>

A 2D car was equipped with a set of test tires of each example mounted on a rim and driven for a total of 10000 km on public asphalt roads. Then, the depths of the four main grooves of each of the two front wheel tires were measured and averaged. The results are expressed as an index, with Comparative Example 1 taken as 100. A higher index indicates better vehicle abrasion resistance.

TABLE 11

| | | Example | | | | | | | Comparative Example | | |
|---|---|---|---|---|---|---|---|---|---|---|---|
| | | 1 | 2 | 3 | 4 | 5 | 6 | 7 | 1 | 2 | 3 |
| | Land ratio | 85 | 85 | 83 | 87 | 85 | 85 | 85 | 85 | 75 | 85 |
| Amount (parts by mass) | NR | 30 | 20 | 30 | 30 | 30 | 30 | 30 | 70 | 30 | 60 |
| | SBR | 30 | 40 | 30 | 30 | 30 | 30 | 30 | | 30 | |
| | BR | 40 | 40 | 40 | 40 | 40 | 40 | 40 | 30 | 40 | 40 |
| | Fine particle carbon black 1 | 20 | 20 | 20 | 20 | 30 | | | | 20 | 20 |
| | Fine particle carbon black 2 | | | | | | 20 | | | | |
| | Fine particle carbon black 3 | | | | | | | 20 | | | |
| | Carbon black 4 | 40 | 40 | 40 | 40 | 30 | 40 | 40 | 50 | 40 | 40 |
| | Wax | 2.0 | 2.0 | 2.0 | 2.0 | 2.0 | 2.0 | 2.0 | 2.0 | 2.0 | 2.0 |
| | Antioxidant | 3.0 | 3.0 | 3.0 | 3.0 | 3.0 | 3.0 | 3.0 | 3.0 | 3.0 | 3.0 |
| | Stearic acid | 3.0 | 3.0 | 3.0 | 3.0 | 3.0 | 3.0 | 3.0 | 3.0 | 3.0 | 3.0 |
| | Zinc oxide | 4.0 | 4.0 | 4.0 | 4.0 | 4.0 | 4.0 | 4.0 | 4.0 | 4.0 | 4.0 |
| | Oil | 3.0 | 3.0 | 3.0 | 3.0 | 3.0 | 3.0 | 3.0 | 3.0 | 3.0 | 3.0 |
| | Sulfur | 1.5 | 1.5 | 1.5 | 1.5 | 1.5 | 1.5 | 1.5 | 1.5 | 1.5 | 1.5 |
| | Vulcanization accelerator | 1.5 | 1.5 | 1.5 | 1.5 | 1.5 | 1.5 | 1.5 | 1.5 | 1.5 | 1.5 |
| Styrene content (% by mass)/rubber component | | 7.1 | 9.4 | 7.1 | 7.1 | 7.1 | 7.1 | 7.1 | 0.0 | 7.1 | 0.0 |
| Evaluation | Abrasion resistance index | 200 | 221 | 200 | 200 | 212 | 196 | 191 | 100 | 200 | 170 |
| | Heat build-up index | 100 | 89 | 100 | 100 | 91 | 102 | 104 | 122 | 100 | 110 |
| | Abrasion resistance (on vehicle) | 201 | 222 | 193 | 213 | 211 | 196 | 190 | 100 | 159 | 68 |

As shown in Table 1, very high on-vehicle abrasion resistance was exhibited in the examples using a tread portion which included a rubber composition containing an isoprene rubber, a butadiene rubber, a styrene-butadiene rubber, and a carbon black having a predetermined average particle size and/or a predetermined cetyltrimethylammonium bromide adsorption specific surface area, and which had a land ratio adjusted to at least a predetermined value. Moreover, a reduction in heat build-up was achieved in the examples. In contrast, these properties were poor in Comparative Example 2 having a low land ratio and Comparative Example 3 containing no SBR.

REFERENCE SIGNS LIST

1: tire (pneumatic tire for heavy duty use)
2: tread portion
3: main groove
4: main crown groove
5: main shoulder groove
7: middle land portion
7e: contact surface of middle land portion
8: crown land portion
9: shoulder land portion
30: horizontal middle groove
30a: first portion of horizontal middle groove
30b: second portion of horizontal middle groove
30c: third portion of horizontal middle groove
30e: edge of horizontal middle groove
31: horizontal crown groove
Te: tread edge
TW: tread width

The invention claimed is:

1. A heavy duty pneumatic tire, comprising a tread portion,
    the tread portion comprising a rubber composition containing:
        an isoprene rubber;
        a butadiene rubber;
        a styrene-butadiene rubber; and
        a carbon black having at least one of
            an average particle size of 20 nm or less or
            a cetyltrimethylammonium bromide adsorption specific surface area of 130 m$^2$/g or more,
    entire tread portion having a land ratio of 81% or higher;
    wherein the rubber composition has abrasion resistance index of 140 or higher.

2. The heavy duty pneumatic tire according to claim 1, wherein the rubber composition further contains a carbon black having at least one of an average particle size of more than 20 nm but not more than 25 nm or a cetyltrimethylammonium bromide adsorption specific surface area of at least 100 m$^2$/g but less than 130 m$^2$/g.

3. The heavy duty pneumatic tire according to claim 1, wherein the rubber composition has a total styrene content of 2.0 to 11.0% by mass based on 100% by mass of a rubber component in the rubber composition.

4. The heavy duty pneumatic tire according to claim 1, wherein the amount of the isoprene rubber based on 100% by mass of the rubber component in the rubber composition being 40% by mass or less.

5. The heavy duty pneumatic tire according to claim 1, wherein the rubber composition further contains a second carbon black having at least one of
    an average particle size of more than 20 nm but not more than 25 nm or
    a cetyltrimethylammonium bromide adsorption specific surface area of at least 100 m$^2$/g but less than 130 m$^2$/g.

* * * * *